United States Patent
Auerbach et al.

(10) Patent No.: US 6,970,289 B1
(45) Date of Patent: Nov. 29, 2005

(54) SCREEN FOR REAR PROJECTION DISPLAY

(75) Inventors: Roy Auerbach, Cincinnati, OH (US); Joachim Bunkenburg, Victor, NY (US); Brahim Dahmani, Montrouge (FR); E. Gregory Fulkerson, Amelia, OH (US); Simon Magarill, Cincinnati, OH (US); John D Rudolph, Cincinnati, OH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/069,695

(22) PCT Filed: Aug. 23, 2000

(86) PCT No.: PCT/US00/23124

§ 371 (c)(1),
(2), (4) Date: Aug. 5, 2002

(87) PCT Pub. No.: WO01/14927

PCT Pub. Date: Mar. 1, 2001

(51) Int. Cl.[7] .................... G03B 21/56; G03B 21/60
(52) U.S. Cl. ........................... 359/457; 359/460
(58) Field of Search ................. 359/443, 450, 359/457, 458, 460

(56) References Cited

U.S. PATENT DOCUMENTS

| | | | |
|---|---|---|---|
| 3,580,661 A | 5/1971 | Cooper, Jr. | |
| 3,830,556 A | 8/1974 | Bratkowski | |
| 4,184,762 A | 1/1980 | Guzman | |
| 4,526,439 A | 7/1985 | Okoshi et al. | |
| 4,666,248 A | 5/1987 | van de Ven | |
| 4,725,134 A * | 2/1988 | Ogino | 359/457 |
| 5,111,337 A | 5/1992 | Martinez | |
| 5,210,641 A | 5/1993 | Lewis | |
| 5,870,224 A | 2/1999 | Saitoh et al. | |
| 6,275,334 B1 * | 8/2001 | Park | 359/457 |
| 6,327,083 B1 * | 12/2001 | Goldenberg et al. | 359/460 |
| 6,437,914 B1 * | 8/2002 | Hall et al. | 359/457 |
| 6,594,079 B1 * | 7/2003 | Trott et al. | 359/456 |
| 6,788,460 B2 * | 9/2004 | Knox et al. | 359/457 |

FOREIGN PATENT DOCUMENTS

JP  2000-035616  2/2000

* cited by examiner

Primary Examiner—Christopher Mahoney
(74) Attorney, Agent, or Firm—Maurice M. Klee; Ronald J. Paglierani

(57) ABSTRACT

A rear projection screen for use with a projection lens which has an exit pupil (23) is provided. The screen has a light entering side and a light exiting side and comprises in order from said light entering side to said light exiting side: (a) a Fresnel structure (11); (b) a lenslet array (13); and (c) an opaque layer (15) comprising a plurality of pinholes, said pinholes being at locations which correspond to the images of the exit pupil formed by the combination of the Fresnel structure and the lenslet array.

17 Claims, 4 Drawing Sheets

SCREEN FOR REAR PROJECTION DISPLAY

CROSS REFERENCE TO RELATED APPLICATIONS

This application is the U.S. national phase under 35 USC § 371 of International Application No. PCT/US00/23124, filed Aug. 23, 2000, which was published in English under PCT Article 21(2) on Mar. 1, 2001 as International Publication No. WO 01/14927. This application claims the benefit under 35 USC § 119(e) of U.S. Provisional Application No. 60/150,451 filed Aug. 24, 1999, the contents of which in its entirety is hereby incorporated by reference.

I. FIELD OF INVENTION

This invention relates to rear screen projection systems including CRT, LCD, and DLP displays, as well as slide projectors.

II. BACKGROUND OF THE INVENTION

A projection screen is an optical device which does not create an image but provides a required field of view in the vertical and horizontal directions of viewer space. By reducing the field of view in the vertical direction, the screen creates the effect of increasing the brightness of the image within the viewing area, an effect which is referred to in the art as gain.

III. SUMMARY OF THE INVENTION

The invention provides a new structure for a compound screen for a rear projection display. More particularly, the invention provides a rear projection screen for use with a projection lens which has an exit pupil (23 in FIG. 3), said screen having a light entering side and a light exiting side and comprising in order from said light entering side to said light exiting side:
  (a) a Fresnel structure (11 in FIG. 1);
  (b) a lenslet array (13 in FIG. 1); and
  (c) an opaque layer (15 in FIG. 1) comprising a plurality of pinholes, said pinholes being at locations which correspond to the images of the exit pupil formed by the combination of the Fresnel structure and the lenslet array.

The lenslet array can comprise elements which have a square aperture in which case, in viewer space, the screen's half field of view $\alpha$ can be described by the equation:

$$\alpha = \tan^{-1}(0.5 \cdot CA/f)$$

where CA and f are, respectively, the clear aperture and the focal length of the elements.

Alternatively, the lenslet array can comprise elements which have a rectangular aperture in which case the screen's vertical half field of view $\alpha_V$ and horizontal half field of view $\alpha_H$, in viewer space, can be described by the equations:

$$\alpha_V = \tan^{-1}(0.5 \cdot CA_V/f)$$

and $$\alpha_H = \tan^{-1}(0.5 \cdot CA_H/f)$$

where $CA_V$, $CA_H$, and f are, respectively, the vertical clear aperture, the horizontal clear aperture, and the focal length of the elements.

As a further alternative, the lenslet array can comprise anamorphic elements in which case the screen's vertical half field of view $\alpha_V$ and horizontal half field of view $\alpha_H$, in viewer space, can be described by the equations:

$$\alpha_V = \tan^{-1}(0.5 \cdot CA/f_V)$$

and $$\alpha_H = \tan^{-1}(0.5 \cdot CA/f_H)$$

where CA, $f_V$, and $f_H$ are, respectively, the clear aperture, the vertical focal length, and the horizontal focal length of the elements.

The screen can comprise a protective layer on the light exiting side of the opaque layer. The Fresnel structure, the lenslet array, the opaque layer, and the protective layer can be arranged as subassemblies, e.g., the Fresnel structure and the lenslet array can be arranged in one subassembly and the opaque layer and the protective layer can be arranged in another subassembly.

When the screen is used with a pixelized panel, the lenslet array can comprise elements whose size is at least several times smaller than the magnified image of a pixel produced at the array by the projection lens. Similarly, when the screen is used with a cathode ray tube, the lenslet array can comprise elements whose size is at least several times smaller than the magnified image of a dot spot of the cathode ray tube produced at the array by the projection lens.

The accompanying drawings, which are incorporated in and constitute part of the specification, illustrate the various aspects of the invention, and together with the description, serve to explain the principles of the invention. It is to be understood, of course, that both the drawings and the description are explanatory only and are not restrictive of the invention.

IV. BRIEF DESCRIPTION OF THE DRAWINGS

Figure 1:
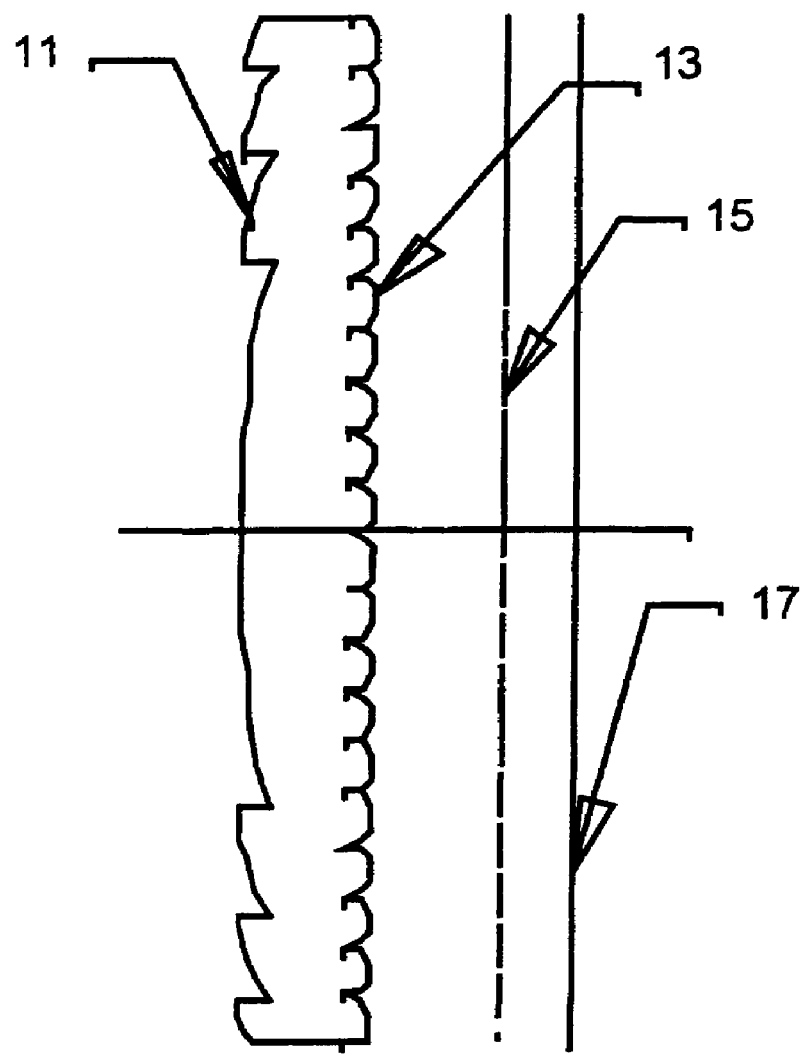
FIG. 1 is a schematic drawing of a rear projection screen constructed in accordance with the invention.

The reference numbers used in the drawings refer to the following:
  11 Fresnel structure
  13 lenslet array
  15 opaque layer with pinholes
  17 smooth surface of protective layer
  19 elements of lenslet array
  21 magnified image of single pixel
  23 exit pupil of projection lens
  25 light from projection lens
  27 parallel beam
  29 light in viewer space

V. DESCRIPTION OF THE INVENTION

The structure of a screen constructed in accordance with the invention is shown in FIG. 1.

As shown in this figure, the compound screen has four elements which are: (1) Fresnel structure 11; (2) lenslet array 13; (3) opaque layer 15 with two dimensional structure of precision pinholes; and (4) a protective layer having a smooth outer surface 17. These elements can be arranged in two components as shown in FIG. 1, where one component is a substrate with a Fresnel structure on one side and a lenslet array on the other and the other component has an opaque layer with a pinhole structure on one side and a smooth second side which serves as a protective layer.

The four elements listed above can be arranged in any combination of subassemblies but must have the following order from the projection lens to the viewer: Fresnel structure, lenslet array, and opaque layer with pinholes. The protective layer may not be necessary for all applications or may be unnecessary with the selection of a suitable opaque layer. When used, the flat protective layer on the viewer side provides an easy way to clean the screen with typical methods and products for cleaning. Also, this layer adds abrasion and impact resistance to the screen.

Figure 2:
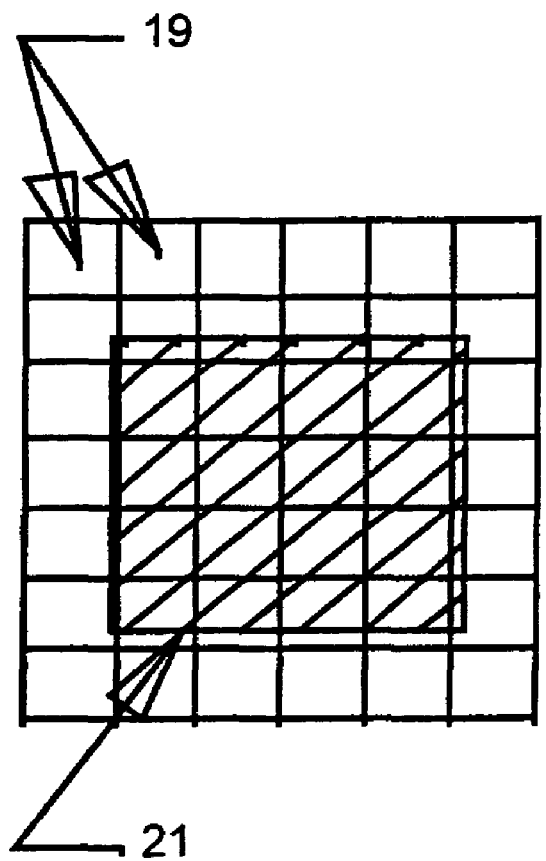
FIG. 2 is a schematic drawing illustrating the correlation between the size of a lenslet array element and the projected image of a single pixel.

FIG. 2 shows a lenslet array where the shape of each element 19 of the array has a square aperture to collect all light from the projection lens. As illustrated in this figure, the size of each element 19 is much (at least several times) smaller than the magnified image 21 of a projected pixel of a LCD/DLP or the dot spot of a CRT. This provides elimination of moiré effects on the screen.

Figure 3:
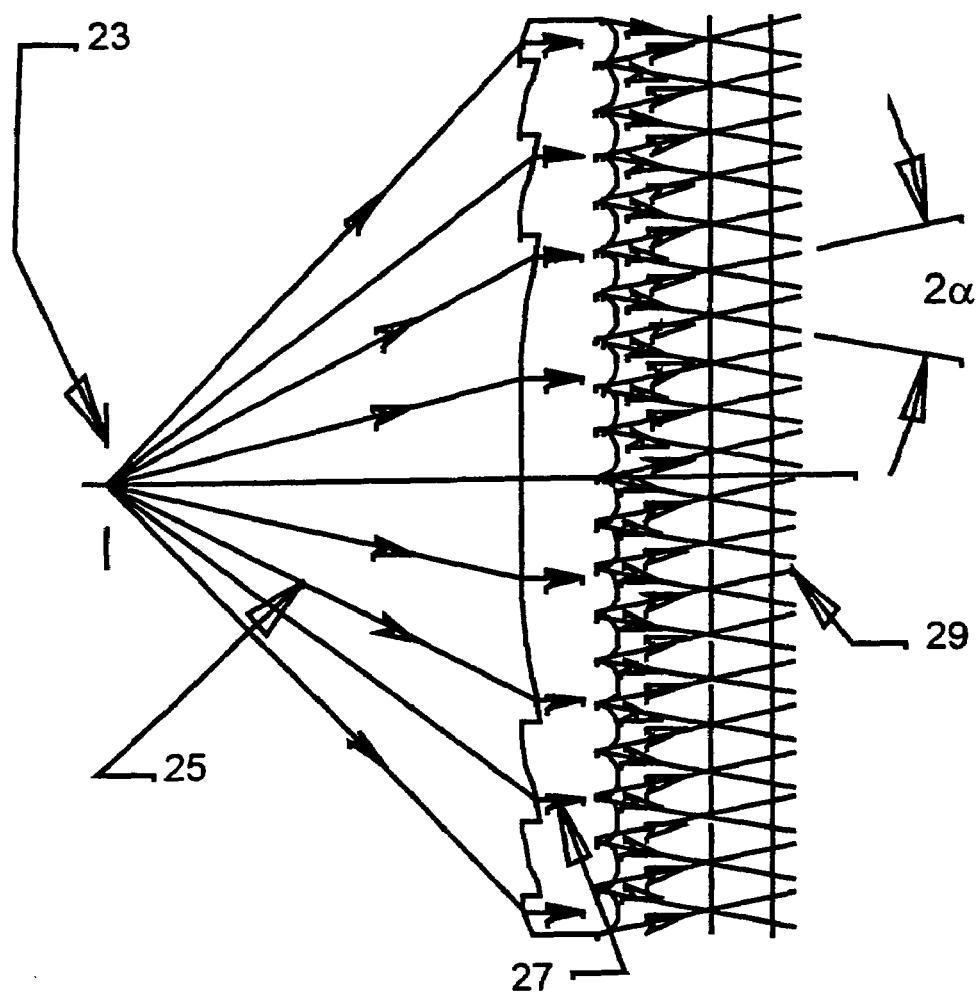
FIG. 3 is a conceptual ray tracing for the rear projection screen of FIG. 1.

The work of the screen is illustrated in FIG. 3. Light 25 from the exit pupil 23 of the projection lens illuminates the Fresnel structure which has a front focal distance equal to the distance from the exit pupil of the projection lens to the screen. This means that after refraction on the Fresnel structure, the light becomes parallel to the optical axis as shown at 27. Each element of the lenslet array focuses the light in its back focal plane. Light then passes through the holes in the opaque layer and exits into the viewer space as shown at 29.

The field of view in the viewer space can be calculated as:

$$\tan(\alpha) = \frac{0.5 \times CA}{f'}$$

where $\alpha$ is the half of field of view (angular dimension), CA is the clear aperture (optical diameter) of a single element of the lenslet array, and $f$ is the focal distance of the element.

Figure 4:
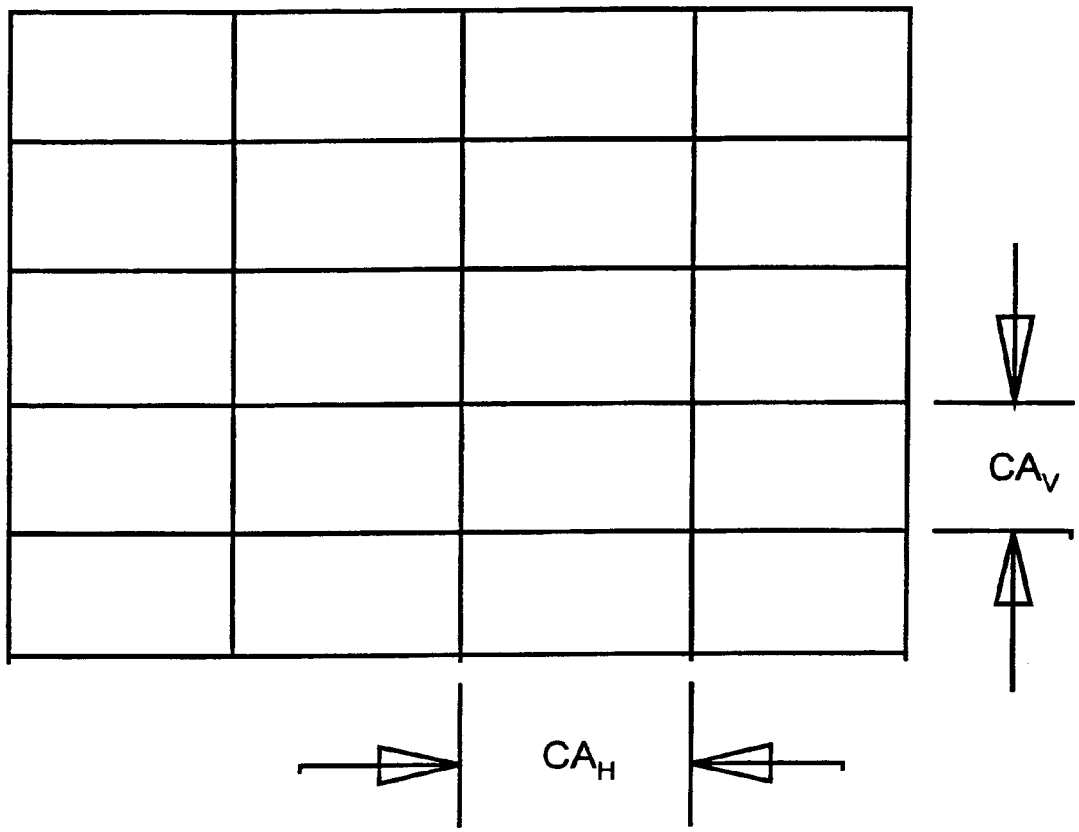
FIG. 4 is a schematic drawing illustrating lenslet array elements having a rectangular aperture.

To provide a different field of view in the vertical and horizontal directions two different solution can be implemented:

(1) Each element of the lenslet array can have a rectangular aperture as shown in FIG. 4. In this case the vertical and horizontal fields of view can be determined as:

$$\tan(\alpha_V) = \frac{0.5 \times CA_V}{f'}, \quad \tan(\alpha_H) = \frac{0.5 \times CA_H}{f'}$$

where $\alpha_V$ and $\alpha_H$ are the half angular fields of view in the vertical and horizontal directions, respectively, and $CA_V$ and $CA_H$ are the clear aperture of the element in these directions.

(2) Each element of the lenslet array can have a toroidal shape to provide different focal lengths in the vertical and horizontal directions (anamorphic property). For this case the equations for the vertical and horizontal fields of view are:

$$\tan(\alpha_V) = \frac{0.5 \times CA}{f'_V}, \quad \tan(\alpha_H) = \frac{0.5 \times CA}{f'_H}$$

where $fv'$ and $fH'$ are the focal lengths of the element in the vertical and horizontal directions.

The opaque layer with the sets of pinholes can be done out of photoresist material. This material is exposed with an electromagnetic field and developed with an appropriate chemical process. The process of exposure is done after both components of the screen are assembled. The source of the electromagnetic field is located at the position of the exit pupil of the projection lens (see FIG. 3). This provides automatic compensation of all inaccuracies in the lenslet array with an appropriate shape and location of the pinholes in the developed opaque layer.

To increase the contrast and reduce the reflection of ambient light in the viewer space the opaque layer can be further improved by the addition of materials which increases the absorption of this layer. All air contact surfaces of the screen can have antireflection coatings that reduce the reflectivity and increase the contrast.

By using identical materials or materials with appropriate thermal coefficients of expansion, the optical properties of the screen can be maintained throughout the temperature and humidity variations which can be expected from seasonal climate conditions and set operation.

From the foregoing, it can be seen that the benefits of the screen design of the invention include:
elimination of moiré effect;
full control of vertical and horizontal field of view in viewer space;
low loss for light propagation from the projection lens to the
viewer space and high loss of light (opaque property) in reverse
direction; and
a protective layer on the outside side of the screen.

Although specific embodiments of the invention have been described and illustrated, it will be apparent to those skilled in the art that modifications and variations can be made without departing from the invention's spirit and scope. The following claims are thus intended to cover the specific embodiments set forth herein as well as such modifications, variations, and equivalents.

What is claimed is:

1. A rear projection screen for use with a projection lens which has an exit pupil (the "projection lens' exit pupil"), said screen having a light entering side and a light exiting side and comprising in order from said light entering side to said light exiting side:
 (a) a Fresnel structure;
 (b) a lenslet array; and
 (c) an opaque layer comprising a plurality of holes, said holes being at locations which correspond to the images of the projection lens' exit pupil formed by the combination of the Fresnel structure and the lenslet array, wherein:
 (i) the screen is for use with a pixelized panel and the lenslet array comprises elements whose size is at least several times smaller than the magnified image of a pixel produced at the array by the projection lens: or (ii) the screen is for use with a cathode ray tube and the lenslet array comprises elements whose size is at least several times smaller than the magnified image of a dot spot of the cathode ray tube produced at the array by the projection lens.

2. The screen of claim 1 wherein the lenslet array comprises elements which have a square aperture.

3. The screen of claim 2 wherein, in viewer space, the screen has a half field of view α given by:

$$\alpha = \tan^{-1}(0.5 \cdot CA/f)$$

where CA and f are, respectively, the clear aperture and the focal length of the elements.

4. The screen of claim 1 wherein the lenslet array comprises elements which have a rectangular aperture.

5. The screen of claim 4 wherein, in viewer space, the screen has a vertical half field of view $\alpha_v$ given by:

$$\alpha_v = \tan^{-1}(0.5 \cdot CA_v/f)$$

and a horizontal half field of view $\alpha_H$ given by:

$$\alpha_H = \tan^{-1}(0.5 \cdot CA_H/f)$$

where $CA_v$, $CA_H$, and f are, respectively, the vertical clear aperture, the horizontal clear aperture, and the focal length of the elements.

6. The screen of claim 1 wherein the lenslet array comprises anamorphic elements.

7. The screen of claim 6 wherein, in viewer space, the screen has a vertical half field of view $\alpha_v$ given by:

$$\alpha_v = \tan^{-1}(0.5 \cdot CA/f_v)$$

and a horizontal half field of view $\alpha_H$ given by:

$$\alpha_H = \tan^{-1}(0.5 \cdot CA/f_H)$$

where CA, $f_v$, and $f_H$ are, respectively, the clear aperture, the vertical focal length, and the horizontal focal length of the elements.

8. The screen of claim 1 further comprising a protective layer on the light exiting side of the opaque layer.

9. The screen of claim 8 wherein the Fresnel structure, the lenslet array, the opaque layer, and the protective layer are arranged as subassemblies.

10. The screen of claim 9 wherein the Fresnel structure and the lenslet array are arranged in one subassembly and the opaque layer and the protective layer are arranged in another subassembly.

11. A rear screen projection system comprising a projection lens having an exit pupil (the "projection lens' exit pupil") and a rear projection screen which has a light entering side and a light exiting side and comprises in order from said light entering side to said light exiting side:

(a) a Fresnel structure;
(b) a lenslet array; and
(c) an opaque layer comprising a plurality of holes, said holes being at locations which correspond to the images of the projection lens' exit pupil formed by the combination of the Fresnel structure and the lenslet array;

wherein the Fresnel structure has a front focal distance and the distance from the projection lens' exit pupil to the screen is equal to said front focal distance, wherein:

(i) the screen is for use with a pixelized panel and the lenslet array comprises elements whose size is at least several times smaller than the magnified image of a pixel produced at the array by the projection lens: or (ii) the screen is for use with a cathode ray tube and the lenslet array comprises elements whose size is at least several times smaller than the magnified image of a dot spot of the cathode ray tube produced at the array by the projection lens.

12. The rear screen projection system of claim 11 wherein the lenslet array comprises elements which have a square aperture.

13. The rear screen projection system of claim 12 wherein, in viewer space, the screen has a half field of view α given by:

$$\alpha = \tan^{-1}(0.5 \cdot CA/f)$$

where CA and f are, respectively, the clear aperture and the focal length of the elements.

14. The rear screen projection system of claim 11 wherein the lenslet array comprises elements which have a rectangular aperture.

15. The rear screen projection system of claim 14 wherein, in viewer space, the screen has a vertical half field of view $\alpha_v$ given by:

$$\alpha_v = \tan^{-1}(0.5 \cdot CA_v/f)$$

and a horizontal half field of view $\alpha_H$ given by:

$$\alpha_H = \tan^{-1}(0.5 \cdot CA_H/f)$$

where $CA_v$, $CA_H$, and f are, respectively, the vertical clear aperture, the horizontal clear aperture, and the focal length of the elements.

16. The rear screen projection system of claim 11 wherein the lenslet array comprises anamorphic elements.

17. The rear screen projection system of claim 16 wherein, in viewer space, the screen has a vertical half field of view $\alpha_v$ given by:

$$\alpha_v = \tan^{-1}(0.5 \cdot CA/f_v)$$

and a horizontal half field of view $\alpha_H$ given by:

$$\alpha_H = \tan^{-1}(0.5 \cdot CA/f_H)$$

where CA, $f_v$, and $f_H$ are, respectively, the clear aperture, the vertical focal length, and the horizontal focal length of the elements.

* * * * *